(12) United States Patent
Luo et al.

(10) Patent No.: US 11,321,173 B2
(45) Date of Patent: May 3, 2022

(54) MANAGING STORAGE OF MULTIPLE PLANE PARITY DATA IN A MEMORY SUB-SYSTEM

(71) Applicant: Micron Technology, Inc., Boise, ID (US)

(72) Inventors: Xiangang Luo, Fremont, CA (US); Jianmin Huang, San Carlos, CA (US); Lakshmi Kalpana K. Vakati, Fremont, CA (US); Harish R. Singidi, Fremont, CA (US)

(73) Assignee: Micron Technology, Inc., Boise, ID (US)

( * ) Notice: Subject to any disclaimer, the term of this patent is extended or adjusted under 35 U.S.C. 154(b) by 72 days.

(21) Appl. No.: 16/854,429

(22) Filed: Apr. 21, 2020

(65) Prior Publication Data
US 2021/0200637 A1     Jul. 1, 2021

Related U.S. Application Data (60) Provisional application No. 62/955,748, filed on Dec. 31, 2019.

(51) Int. Cl.
*G06F 11/10* (2006.01)
*G06F 3/06* (2006.01)

(52) U.S. Cl.
CPC ........ *G06F 11/1076* (2013.01); *G06F 3/0619* (2013.01); *G06F 3/0659* (2013.01); *G06F 3/0673* (2013.01)

(58) Field of Classification Search
CPC .. G06F 11/1076; G06F 3/0619; G06F 3/0659; G06F 3/0673
See application file for complete search history.

(56) References Cited

U.S. PATENT DOCUMENTS

| | | | |
|---|---|---|---|
| 9,720,609 B1* | 8/2017 | Yan | G11C 29/76 |
| 10,127,997 B2* | 11/2018 | Baek | G06F 3/0688 |
| 2014/0281813 A1* | 9/2014 | Wakchaure | G06F 11/108 714/766 |
| 2016/0070507 A1* | 3/2016 | Hoshikawa | G06F 3/0644 711/149 |
| 2018/0089078 A1* | 3/2018 | Ohno | G06F 3/064 |
| 2018/0131390 A1* | 5/2018 | Lee | G06F 11/1012 |
| 2019/0050326 A1* | 2/2019 | Yang | G11C 29/42 |
| 2020/0218605 A1* | 7/2020 | Subramanian | G06F 11/1068 |

* cited by examiner

*Primary Examiner* — Kyle Vallecillo
(74) *Attorney, Agent, or Firm* — Lowenstein Sandler LLP (57) ABSTRACT

Host data to be written to a storage area including a set of multiple planes of a memory device is received. A first parity generation operation based on a portion of the set of multiple planes of the host data to generate a set of multi-plane parity data is executed. The set of multi-plane parity data is stored in in a cache memory of a controller of a memory sub-system. A second parity generation operation based on the set of the multiple planes of the host data to generate a set of multi-page parity data is executed. The set of multi-page parity data in the cache memory of the controller of the memory sub-system is stored. A data recovery operation is performed based on the set of multi-plane parity data and the set of multi-page parity data.

20 Claims, 7 Drawing Sheets

MANAGING STORAGE OF MULTIPLE PLANE PARITY DATA IN A MEMORY SUB-SYSTEM

CROSS-REFERENCE TO RELATED APPLICATION

This application claims the benefit of U.S. Provisional Application No. 62/955,748, titled "Managing Storage of Multiple Plane Parity Data in a Memory Sub-System," filed Dec. 31, 2019, the entire disclosure of which is incorporated herein by reference.

TECHNICAL FIELD

Embodiments of the disclosure relate generally to memory sub-systems, and more specifically, relate to managing storage of multiple plane parity data in a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to managing storage of multiple plane parity data in a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can employ techniques to perform data recovery in the event of a memory defect associated with the programming of user data (e.g., data written by a host system) to a memory device of a memory sub-system. Conventionally, memory defects can be managed by a controller of the memory sub-system by generating parity data (e.g., exclusive or (XOR) parity data) based on the written host data. The generated parity data (e.g., the XOR parity data) is written by the controller to a cache memory (e.g., a volatile memory devices such as random access memory (RAM), dynamic random access memory (DRAM), or synchronous dynamic random access memory (SDRAM)) of the controller.

In many electronic devices (e.g., mobile devices) including memory devices having an array of memory cells storing multiple bits per cell (e.g., quad-level cells (QLCs)), both multiple page (multi-page) parity protection and multiple plane (multi-plane) parity protection (e.g., protection for a failure of all planes of a memory device) is employed. In such systems, a large amount of cache memory storage space is required in order to store both the multi-page parity data and the multi-plane parity data. For example, for multi-page parity protection, 16 KB of parity data is generated for each page line of the memory sub-system. In addition, a conventional memory sub-system can have a multi-plane memory die (e.g., N planes) including multiple blocks of memory cells arranged in multiple planes (e.g., a multi-plane memory device) for which multi-plane parity protection can be employed. Each block can be divided into multiple sub-blocks that each include multiple pages (e.g., three pages per sub-block).

Memory sub-systems having multiple planes (e.g., N planes per memory die) require the generation and storage of multi-plane parity data to enable protection against multi-plane failure (e.g., a failure of all of the planes of a memory device). For example, for a multi-plane arrangement (e.g., a memory die having N planes), conventional systems can generate multi-plane parity data by executing an exclusive or operation (XOR) based on the data written by a host system (also referred to as a resource value (R)) to the multiple logical units (e.g., logical unit 1 to logical unit Y) of the memory sub-system, where each logical unit includes multiple planes (e.g., Plane 0, Plane 1, . . . Plane N–1). The multi-plane parity data for each plane is stored in cache memory of the controller (e.g., RAM). Conventionally, the controller executes an additional XOR operation on the data associated with all of the planes (e.g., the N planes) to generate multi-page parity data from each page or page line. This multi-page parity data is also stored in the cache memory of the controller.

For example, for a multi-plane memory die having N planes having two sub-blocks, where each sub-block includes three pages, 16 KB of parity data is generated and stored per plane. Accordingly, parity data storage on the order of 48 KB per sub-block per N planes is required.

Furthermore, an additional sub-block of cache memory is required for each sub-block of the multi-plane memory in order to generate multi-plane parity data. For example, in a conventional system managing parity data for a multi-plane memory having four planes (N=4), a total controller cache memory requirement for one sub-block of multi-plane parity protection is 96 KB per plane, resulting in a cache memory requirement of 384 KB (e.g., 96 KB×4 planes). This represents a significant controller cache storage expenditure associated with the conventional management of multi-page and multi-plane parity protection. Accordingly, there is need to reduce the expenditure of controller cache memory in connection with the storage of multi-page parity data and the multi-plane parity data used for the execution of a data recovery operation in the event of a loss of host written data.

Aspects of the present disclosure address the above and other deficiencies by having a memory sub-system that manages storage of multi-page parity data and multi-plane parity data by a cache memory storage area of a controller of a memory sub-system. In an embodiment, for a memory sub-system having multiple planes (N planes), a first parity data generation operation (e.g., an exclusive or (XOR) operation) is performed on a portion of the multiple planes (N−1 planes) of the host data stored in logical units (LUNs) of the memory sub-system to generate a first set of multi-plane parity data (P) for storage in the controller cache memory (e.g., RAM of the controller). For example, for a memory sub-system having four planes (e.g., N=4), the multi-plane parity data is generated by executing an XOR operation using a portion (N−1 planes) of the multiple planes (e.g., Plane 0 to Plane 2 (i.e., Plane N−2)) to generate the multi-plane parity data. For example, for a system having N=4 planes, the multi-plane parity data includes a set of multi-plane parity data values including "P00" representing parity data for Page 0, Plane 0; "P10" representing parity data for Page 1, Plane 0; "P20" representing parity data for Page 2, Plane 0 . . . , "P50" representing the parity data for Page 5, Plane 0; "P0N−1" representing parity data for Page 0, Plane 3; "P1N−1" representing parity data for Page 1, Plane 3), etc. Advantageously, less controller cache memory is utilized to store the multi-plane parity data generated as a result of executing the parity operation using a portion (e.g., N−1 planes) of the multiple planes (e.g., Plane 0 to Plane N−2) to achieve a cache memory savings of approximately 48 KB as compared to the above-described conventional approach. In this embodiment, for a multi-plane system having multi-plane multi-sub-block parity protection as described herein results in a controller cache savings of 1/N. For example, a memory device having four planes achieves a controller cache storage savings of 25% (e.g., 96 KB savings), and a memory device having two planes achieves a controller cache storage savings of 50% (192 KB savings) associated with the storage of the multi-plane multi-sub-block parity data.

In an embodiment, a second parity data generation operation is performed using host data of the multiple planes (N planes) stored in logical units (LUNs) of the memory sub-system to generate a set of multi-page parity data for storage in the controller cache memory (e.g., RAM of the controller).

In the event of a data failure, the multi-plane parity data corresponding to the N−1 planes and the multi-page parity data can be retrieved from the cache memory of the controller for use in a data recovery operation. In an embodiment, the data recovery operation can use the multi-plane parity data (corresponding to the N−1 planes of the host data) and the multi-page parity data to retrieve the host data corresponding to the Nth plane (e.g., the last plane).

In an embodiment, additional protection is provided to protect a sub-block of the host data. To protect a sub-block of the host data, a parity data generation operation is performed using two sub-blocks of data to generate multi-plane multi-sub-block protection (e.g., the generation of parity data for multiple sub-blocks of the host data (e.g., sub-block 0 and sub-block 1)). In this embodiment, the cache requirement is reduced from two sub-blocks of parity data, as in conventional systems, to one sub-block of parity data (e.g., the multi-plane multi-sub-block parity data) resulting from the parity data generation operation used to combine the first and second sub-blocks. In the event of a sub-block multi-plane failure, a parity data generation operation can be performed to the multi-plane parity data for the first sub-block and the data for the second sub-block stored in a memory device cache (e.g., a NAND latch) to retrieve the first sub-block's parity data (e.g., sub-block 0) and recover the previous sub-block's host data.

In this embodiment, for a multi-plane system having multi-plane multi-sub-block parity protection as described herein results in a further controller cache savings of 1/N. For example, a memory device having four planes achieves a controller cache storage savings of 25% (e.g., 96 KB savings), and a memory device having two planes achieves a controller cache storage savings of 50% (192 KB savings) associated with the storage of the multi-plane multi-sub-block parity data.

Figure 1:
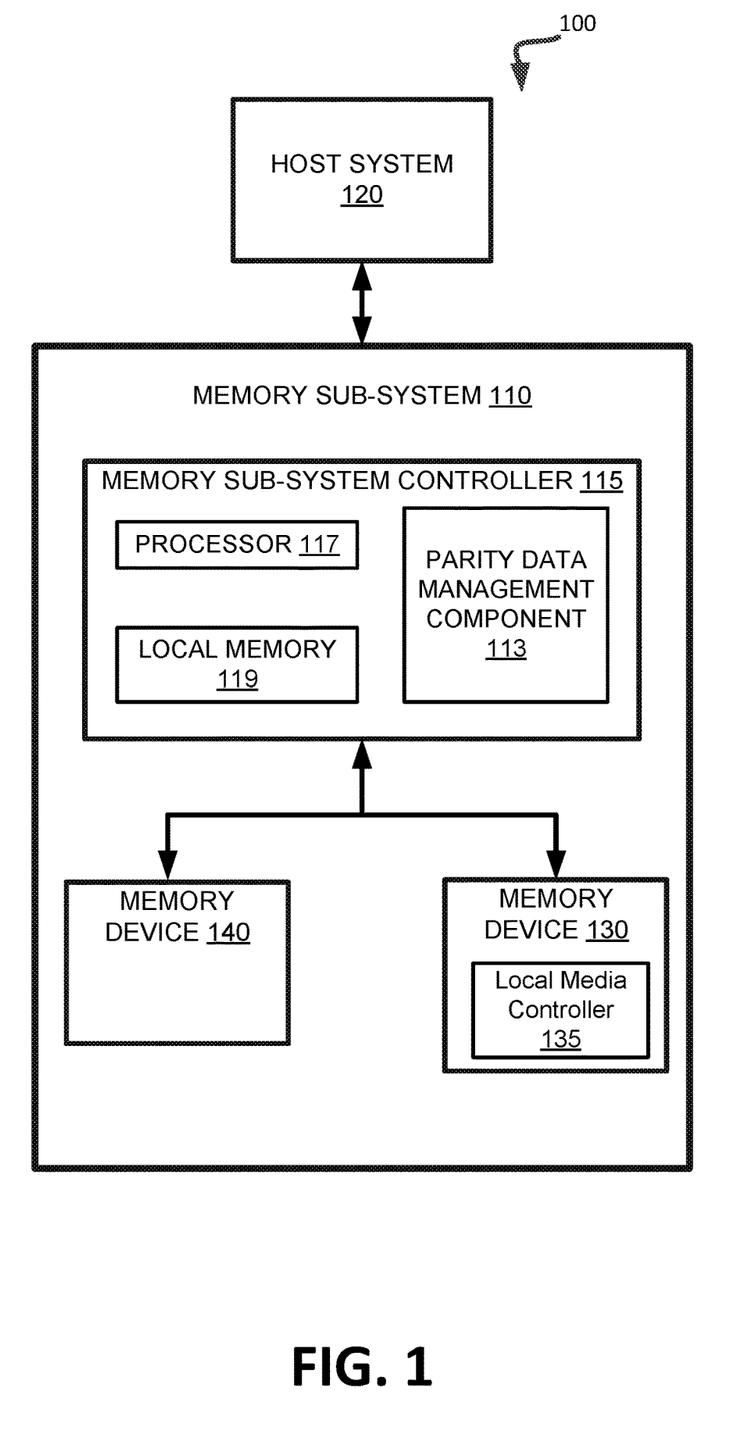
FIG. 1 illustrates an example computing system that includes a memory sub-system in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory subsystem 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory devices such as 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130 and/or the memory device 140. The memory sub-system controller 115 can be responsible for other operations such as wear leveling operations, garbage collection operations, error detection and error-correcting code (ECC) operations, encryption operations, caching operations, and address translations between a logical block address (e.g., logical block address (LBA), namespace) and a physical block address (e.g., physical block address) that are associated with the memory devices 130 and/or the memory device 140. The memory sub-system controller 115 can further include host interface circuitry to communicate with the host system 120 via the physical host interface. The host interface circuitry can convert the commands received from the host system into command instructions to access the memory devices 130 and/or the memory device 140 as well as convert responses associated with the memory devices 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes a parity data management component 113 that can be used to generate and store parity data in a cache memory of a controller of the memory sub-system 110 for use in a data recovery operation associated with data written by the host system 120. In a memory sub-system having multiple planes (N planes), the parity data management component 113 performs a first parity data operation using host written data of a portion of the multiple planes (N−1 planes) stored in logical units (LUN 1 to LUN Y) of the memory sub-system to generate a first set of multi-plane parity data (P) for storage in the controller cache memory (e.g., RAM of the controller). For example, for a memory sub-system having four planes (e.g., N=4), the multi-plane parity data is generated by executing an XOR operation using the host data associated with Plane 0 to Plane N−2 (e.g., the portion of the multiple planes) and is stored in the controller cache memory (e.g., RAM of the controller).

In an embodiment, a second parity data generation operation is performed using the host data of the multiple planes (N planes) stored in logical units (LUNs) of the memory sub-system to generate a set of multi-page parity data for storage in the controller cache memory. In an embodiment, 16 KB of multi-page parity data is generated from each page line (e.g., Page 0, Page 1, Page 2, Page 3, Page 4, and Page 5 of a memory device having two sub-blocks, where each sub-block includes three pages). In an embodiment, the parity data management component 113 can perform a data recovery operation using the parity data stored in the controller cache memory to enable multi-page and multi-plane parity protection, while achieving a controller cache memory storage space savings.

In an embodiment, the parity data management component 113 can generate a set of multi-plane multi-sub-block parity data based on the sub-portion of the multiple planes (N−1 planes) for a first sub-block (e.g., SB X−1, where X=1, 2, or 3 for a memory device having two sub-blocks with three pages each) and a second sub-block (SB X) of a set of sub-blocks to generate multi-plane multi-sub-block parity data for storage in the controller cache memory. In this embodiment, a storage savings is achieved (e.g., a storage savings of 48 KB per N planes for each sub-block) by storing multi-plane multi-sub-block parity data for a current sub-block (sub-block X) and previous sub-block (SB X−1) in the controller cache memory.

In a first embodiment, the parity data management component 113 can generate the multi-plane parity data (e.g., using the first parity data generation operation). In a second embodiment, the multi-plane multi-sub-block parity data. In a third embodiment, the parity data management component 113 can generate both the multi-plane parity data and the multi-plane multi-sub-block parity data.

In some embodiments, the memory sub-system controller 115 includes at least a portion of the parity data management component 113. For example, the memory sub-system controller 115 can include a processor 117 (processing device) configured to execute instructions stored in local memory 119 for performing the operations described herein. In some embodiments, the parity data management component 113 is part of the host system 120, an application, or an operating system. In the same or alternative embodiments, portions of the parity data management component 113 are part of the host system 120 while other portions of the parity data management component 113 are performed at the memory sub-system controller 115.

Figure 2:
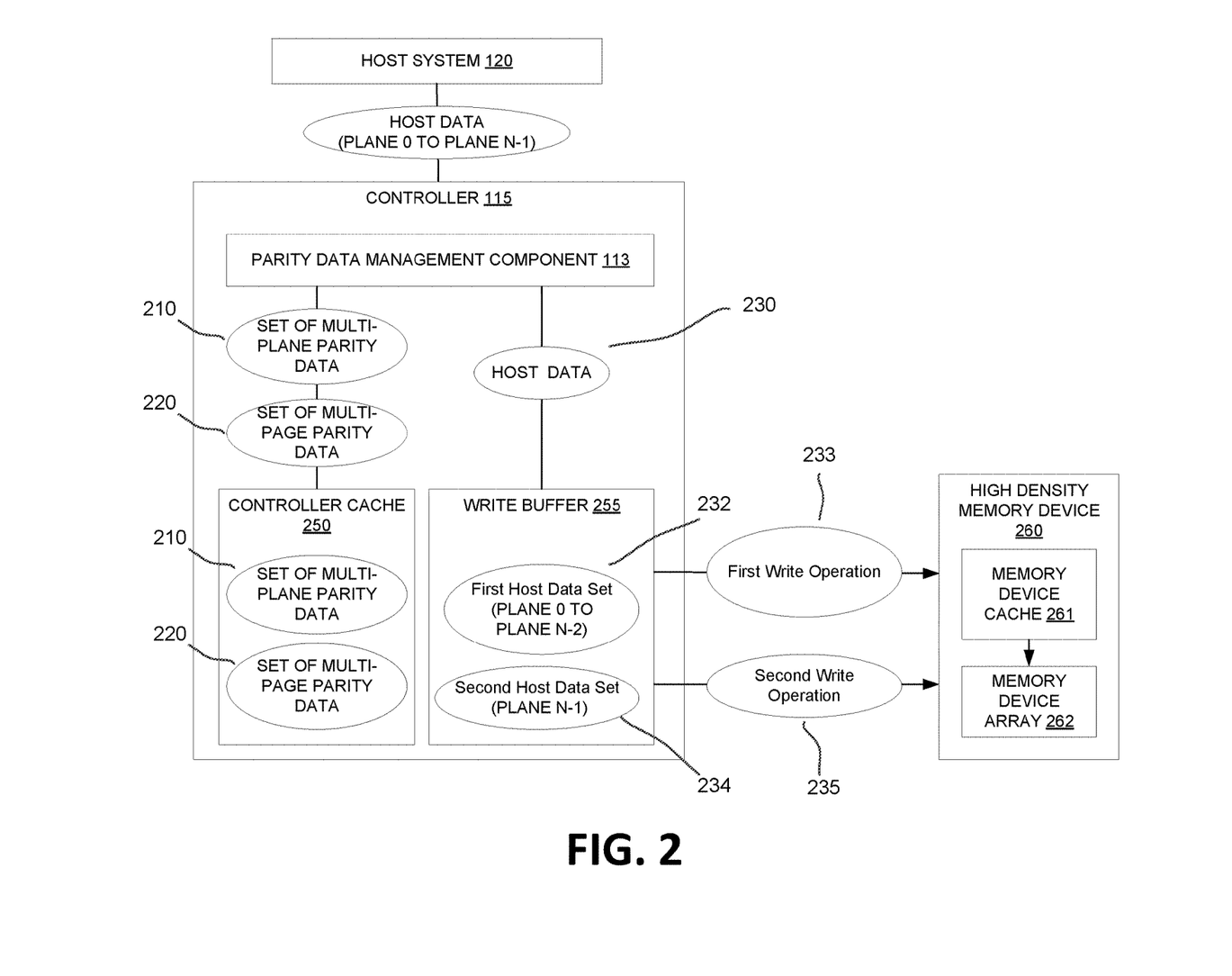
FIG. 2 illustrates an example parity data management component managing a cache memory of a controller to store parity data in accordance with some embodiments.

FIG. 2 illustrates an example system including a controller 115 operatively coupled to a host system 120. As shown, the controller 115 is configured to write the host data to a memory device array 262 of a high density memory device (e.g., a QLC NAND device) 260. In an embodiment, the host data is written to a write buffer 255 of the controller 115 before being written or programmed to a memory device cache 261 (e.g., a NAND latch) of the high density memory device 260.

In an embodiment, multiple LUNs store a logical association between the host data and the physical memory device array 262. The controller 115 includes a parity data management component 113 configured to generate a set of multi-plane parity data and a set of multi-page parity data based on the host data stored in the multiple LUN for storage in a controller cache memory 250.

Figure 3:
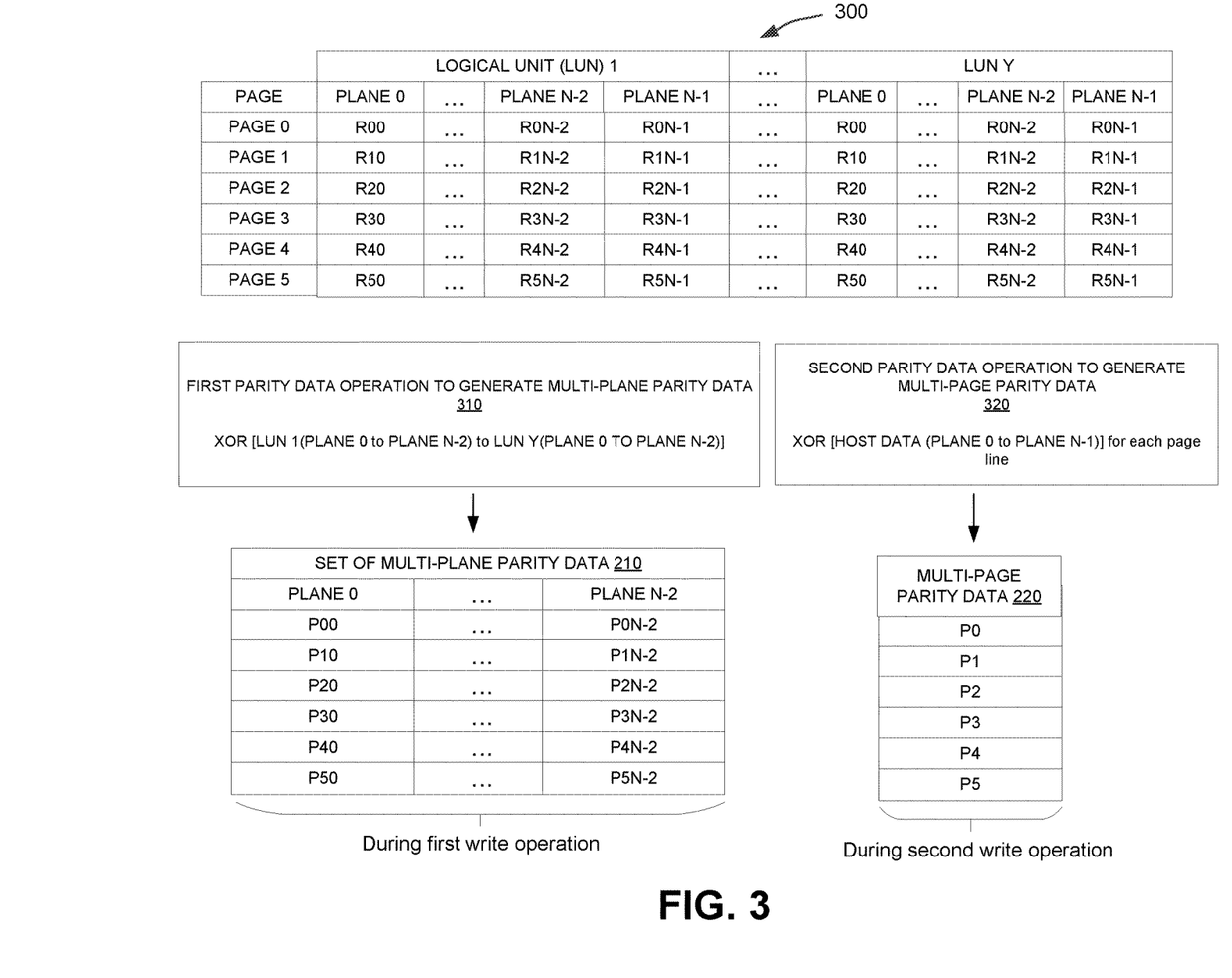
FIG. 3 illustrates example parity data generated in accordance with some embodiments.

FIG. 3 illustrates an example data structure 300 including multiple LUNs (LUN 1 to LUN Y) storing host data corresponding to a memory device array having multiple planes (e.g., a multi-plane memory device). In the example shown, the memory device includes N planes, each including two sub-blocks (e.g., sub-block 0 and sub-block 1) having three pages each. As shown, LUN 1 includes the host data or resource values (R) for each page (e.g., Page 0 to Page 5) for each plane (Plane 0 to Plane N−1). In the example shown, LUN 1 stores "R00" representing the host data for Page 0, Plane 0; "R10" representing the host data for Page 1 Plane 0, Page 1 . . . ; and "R5N−1" representing the host data for Page 5, Plane N−1. As illustrated in the example shown in FIG. 3, the data structure 300 includes the host data (R values) for each page (Page 0 to Page 5) and each plane (Planes P0 to PN−1) stored in the multiple LUNs (e.g., LUN 1 to LUN Y).

As shown in FIG. 2, the host data 230 can include a first host data set 232 corresponding to Plane 0 to Plane N−2 (i.e., the "second to last plane") of the LUNs (LUN 1 to LUN Y) that is written from the write buffer 255 to the high density memory device 260 in a first write operation 233. The host data 230 can include a second host data set 234 corresponding to Plane N−1 of the LUNs (LUN 1 to LUN Y) that is written from the write buffer 255 to the high density memory device 260 in a second write operation 235.

In an embodiment, as shown in FIGS. 2 and 3, the parity data management component 113 executes a first parity data operation to generate the set of multi-plane parity data 210 using the first host data set 232. The set of multi-plane parity data 210 is stored in the controller cache 250 (e.g., the RAM of the controller 115). In an embodiment, the first parity data operation is an XOR operation of the first set of host data (e.g., Plane 0 to Plane N−2) for all of the LUNs (LUN 1 to LUN Y). For example, the first parity data operation can be represented by the following expression:

XOR [LUN 1(PLANE 0 to PLANE N−2) to LUN Y(PLANE 0 to PLANE N−2)]

In an embodiment, the first parity data operation can be performed during or in response to the first write operation (i.e., during the writing of the first set of host data (e.g., Plane 0 to Plane N−2) from the write buffer 255 to the high density memory device 260. As shown in FIG. 3, the set of multi-plane parity data 210 includes a set of parity data values for Plane 0 to Plane N−2 including "P00" representing Page 0, Plane 0; "P10" representing Page 1, Plane 0; . . . and "P5N−2" representing Page 5, Plane N−2. Advantageously, a storage capacity savings corresponding to a plane of data (e.g., 1/N*100% of controller cache, wherein N is the number planes) is realized in the controller cache 250 by generating and storing the set of multi-plane parity data based on N−1 planes of data, as compared to conventional systems which store multi-plane parity data based on N−1 planes of data in the cache of the controller.

In an embodiment, the parity data management component 113 generates a set of multi-page parity data 220 including page line parity data (e.g., P0, P1, P2, P3, P4, and P5) for each page (Pages 0 to 5) by executing a second parity data operation 320. In an embodiment, the second parity data operation is an XOR operation using the host data for all of the N planes for each page or page line. For example, the second parity data operation is executed to generate the page line parity data for Page 0 (denoted as parity value "P0" in FIG. 3), according to the following example expression:

XOR[Host Data(P00 to P0N−1)]=P0.

In an embodiment, the second parity data operation can be performed during or in response to the second write operation (i.e., during the writing of the second set of host data (e.g., Plane N−1)) from the write buffer 255 to the high density memory device 260.

In an embodiment, in the event of a data failure, the set of multi-plane parity data corresponding to the N−1 planes 210 can be retrieved from the cache memory of the controller for use in a data recovery operation. The data recovery operation can use the set of multi-plane parity data 210 and the multi-page parity data 220 to retrieve the data of the Nth plane. Advantageously, the above-described approach enables a savings of 1/N of the cache memory of the controller need to provide for multi-plane protection (e.g., a failure of all of the planes).

Figure 4:
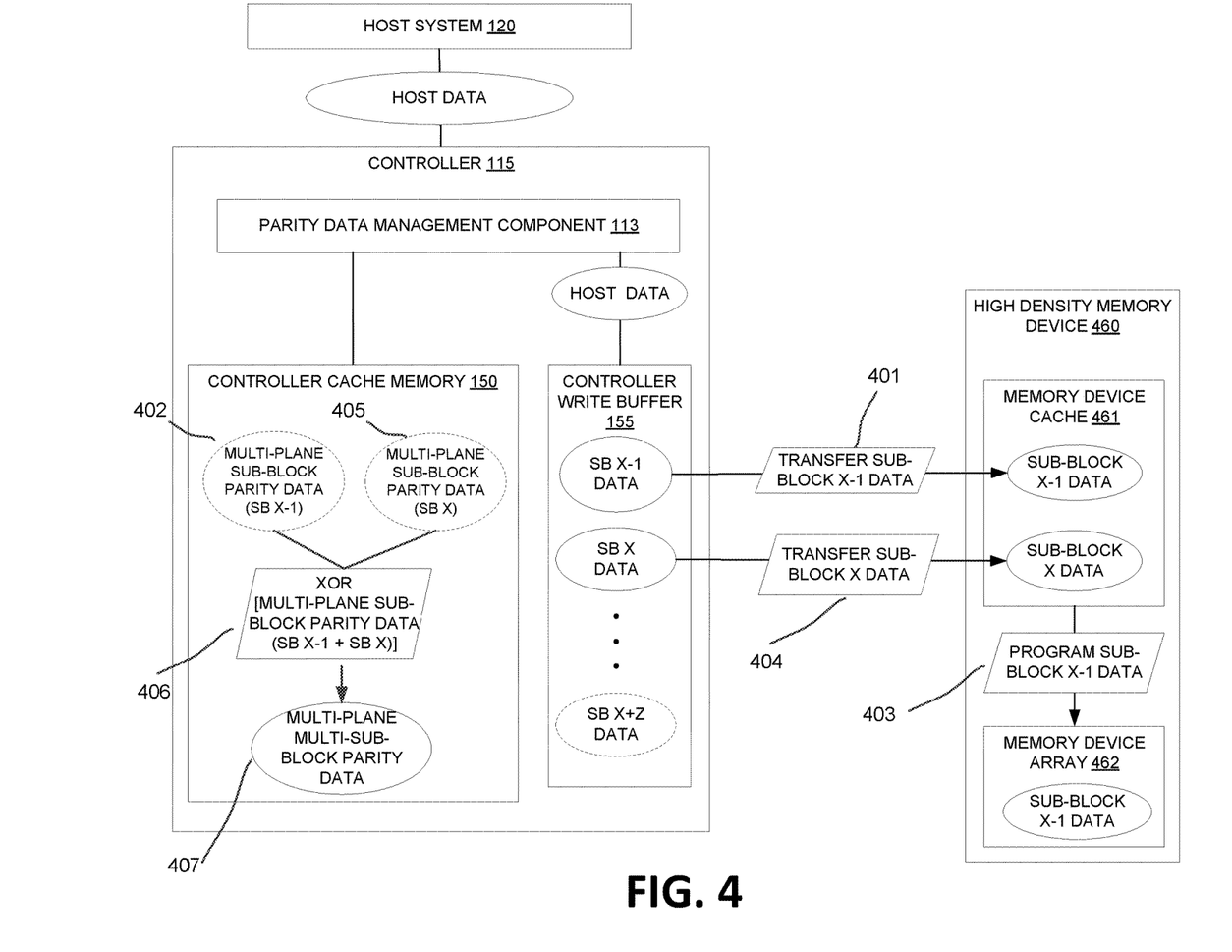
FIG. 4 illustrates an example parity data management component managing a cache memory of a controller to store parity data in accordance with some embodiments.

FIG. 4 illustrates an example system including a controller 115 operatively coupled to a host system 120. As shown, the controller 115 is configured to write the host data to a memory device array 262 of a high density memory device (e.g., a QLC NAND device) 260. In an embodiment, the host data is written to a write buffer 255 of the controller 115 before being written or programmed to a memory device cache 261 (e.g., a NAND latch) of the high density memory device 260. As shown in FIG. 4, the host data includes multiple sub-blocks (SB) of data (e.g., SB X−1 data, SB X data . . . and SB X+Z data), wherein each sub-block includes multiple pages (e.g., three pages). In an embodiment, a first set of host data corresponding to a first sub-block (SB X−1 data) and a second sub-block (SB X data) are stored in a controller write buffer 155.

Figure 5:
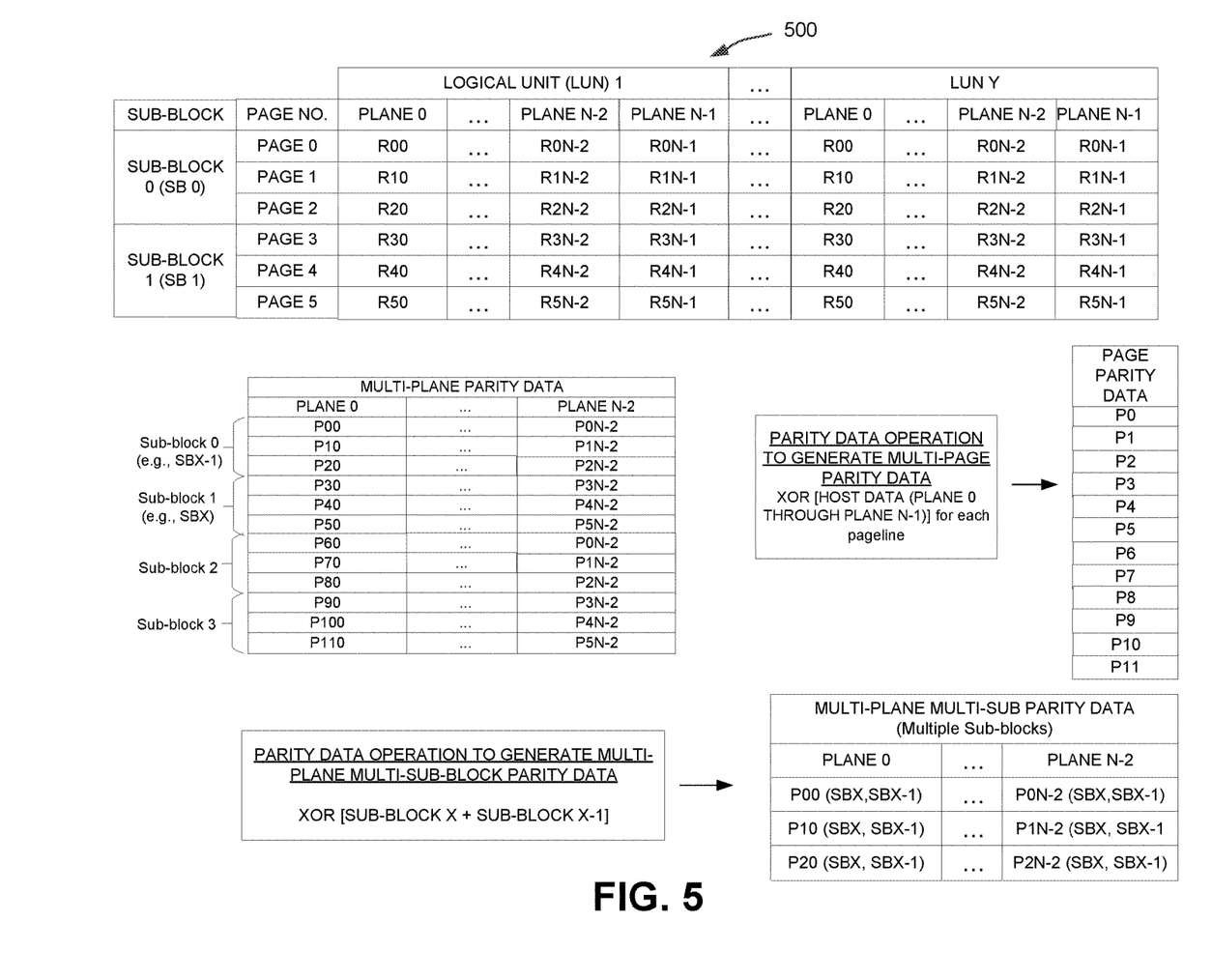
FIG. 5 illustrates example parity data generated in accordance with some embodiments.

FIG. 5 illustrates an example data structure 500 including multiple LUNs (LUN 1 to LUN Y) storing host data corresponding to a memory device array having multiple planes having multiple sub-blocks (e.g., SB 0, SB 1). In the example shown, the memory device includes N planes, each including three sub-blocks (e.g., SB 0 to SB 3) having three pages each. As shown, LUN 1 includes the host data or resource value (R) for each page (e.g., Page 0 to Page 5) for each plane (Plane 0 to Plane N−1). In the example shown, LUN 1 stores "R00" representing the host data for Page 0, Plane 0; "R10" representing Page 1 Plane 0, Page 1 . . . ; and "R5N−1" representing Page 5, Plane N−1.

In an embodiment, as shown in FIG. 4, in operation 401, data of a first sub-block (e.g., sub-block X−1) is transferred from the controller write buffer 155 to a memory device cache 461 (e.g., NAND latch) of a high density memory device 460 (e.g., a QLC NAND). During or in response to operation 401, the parity data management component 113 performs a parity data operation to generate first multi-plane sub-block parity data corresponding to the first sub-block data (herein "multi-plane sub-block parity data"). The multi-plane sub-block parity data (e.g., the multi-plane parity data for SB X−1) is stored in the controller cache memory 150. In an embodiment, the first multi-plane sub-block parity data (e.g., parity data for SB X−1) is generated by performing an XOR operation using a portion of the host data (e.g., R00, R10, R20, R2N−2) corresponding to the pages (e.g., Page 0, Page 1, Page 2) of the corresponding sub-block (e.g., SB 0, wherein X=1). In an embodiment, advantageously, the multi-plane sub-block parity data can be generated using planes P0 to PN−2, resulting in less consumption of the controller cache memory 150, as compared to conventional system which generate the parity data using all of the planes (e.g., P0 to PN−1).

In an embodiment, in operation 403, the sub-block X−1 data is programmed from the memory device cache 461 to the memory device array 462. During or in response to operation 403, a second set of host data corresponding to a second sub-block (e.g., SB X data) is transferred from the controller write buffer 155 to the memory device cache 461 of the high density memory device 460, in operation 404. In addition, during or in response to operation 403, a second set of multi-plane sub-block parity data (corresponding to sub-block X 405 is generated and stored in the controller cache memory 150. In an embodiment, the multi-plane sub-block SB X parity data 405 is referred to as a "current sub-block parity data" since it is involved in the operation 404 and the multi-plane sub-block SB X−1 parity data is referred to as a "previous sub-block parity data" since the corresponding host data (e.g., sub-block X−1 data) has been programmed to the memory device array 462 in operation 403.

In operation 406, the parity data management component 113 executes a parity data generation operation based on the multi-plane sub-block parity data for SBX (the current sub-block, e.g., sub-block 1) and SBX−1 (the previous sub-block, e.g., sub-block 0) to generate multi-plane multi-sub-block parity data 407. In an embodiment, the parity data generation operation is an XOR of the multi-plane sub-block parity data of SBX and SBX−1. In an embodiment, the multi-plane multi-sub-block parity data is stored in the controller cache memory 150.

As shown in FIGS. 4 and 5, the parity data management component 113 performs a parity data operation to generate multi-page parity data for each page line. As described above, the page line parity data (e.g. P0, P1, P2, P3, P4, and P5) for each page (Pages 0 to 5) is generated by executing a parity data operation using the host data for all of the planes (e.g., Plane 0 to Plane N−1). For example, the parity data operation that is executed to generate the page line parity data for Page 0 (denoted as parity value "P0" in FIG.

5) can be represented by the following expression: XOR [Host data (Plane 0 to Plane N−1)]=P0.

In an embodiment, the parity data management component 113 system can perform data recovery operations in response to a sub-block multi-plane failure. In an embodiment, the data recovery operation is performed by executing an XOR operation using the sub-block X data in the memory device cache 461 and the multi-plane multi-sub-block parity data 407 to retrieve the previous sub-blocks (e.g. SBX−1) parity data and recover the previous sub-block's data (e.g., SBX−1's data). Advantageously, the approach illustrated and described in connection with FIGS. 4 and 5 can result in a storage savings of 50% controller cache memory, as compared to conventional approaches. For example, the multi-plane parity data for sub-block 0 (e.g., three pages of parity data) can be combined with the multi-plane parity data for sub-block 1 (e.g., three pages of parity data) with the resulting three pages of multi-plane parity data stored in the controller cache, thereby resulting a savings in the controller cache equivalent to three pages of data storage.

In an embodiment, a parity data generation operation (e.g., an XOR operation) can be performed iteratively using a current sub-block and a previous sub-block. For example, the multi-plane parity data for sub-block 0 can be combined with the multi-plane parity data for sub-block 1, the multi-plane parity data for sub-block 1 can be combined with the multi-plane parity data for sub-block 2, the multi-plane parity data for sub-block 2 can be combined with the multi-plane parity data for sub-block 3, and so on.

In an embodiment, the parity data management component 113 can execute the approach described in connection with FIGS. 2 and 3 in a first embodiment, the approach described in connection with FIGS. 4 and 5 in a second embodiment, or both approaches together in a third embodiment.

Figure 6:
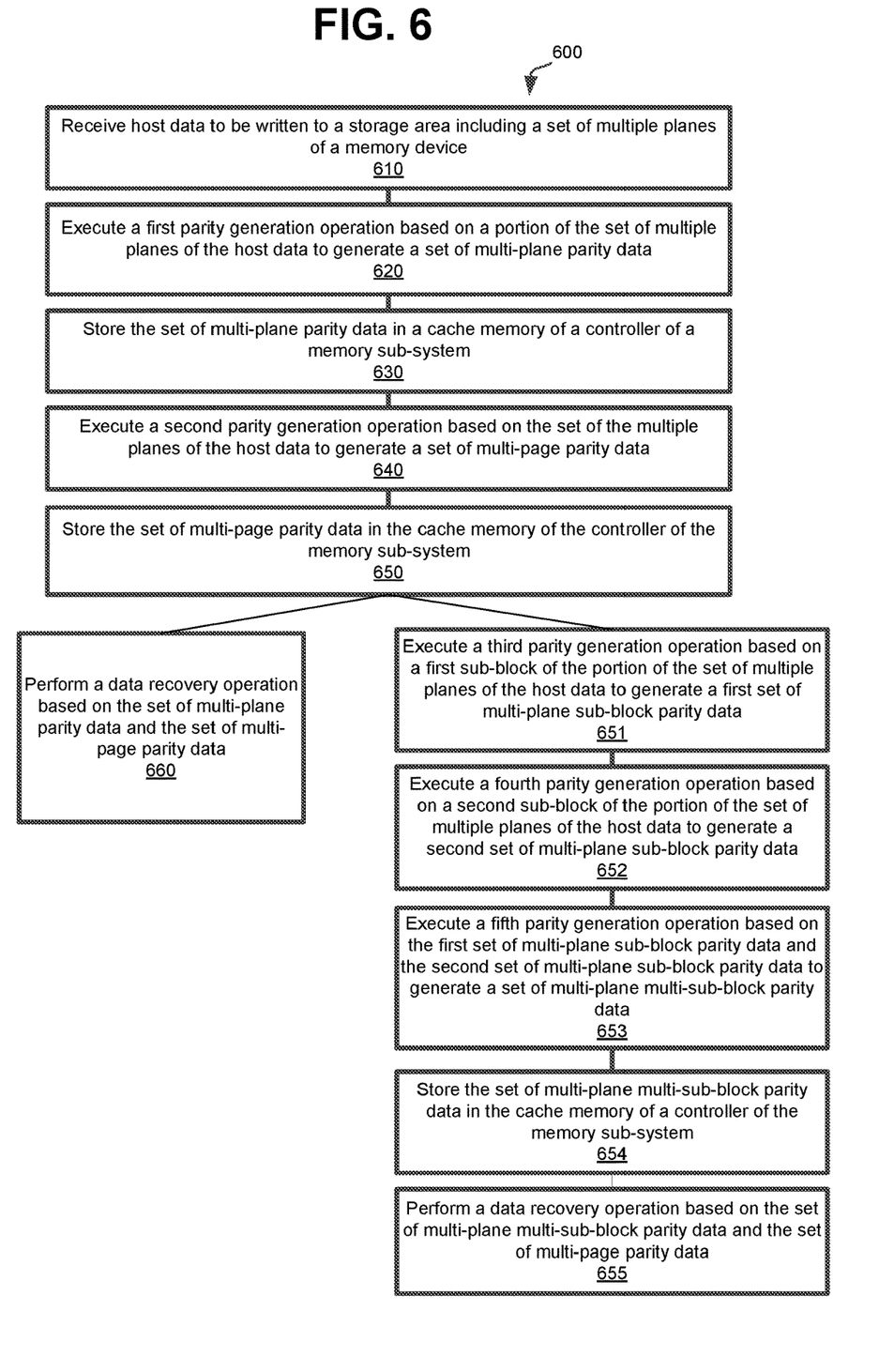
FIG. 6 is a flow diagram of an example method to execute a data recovery operation using parity data generated in accordance with some embodiments.

FIG. 6 is a flow diagram of an example method 600 to perform a data recovery operation using parity data managed by a parity data management component manage in accordance with embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the parity data management component 113 of FIGS. 1, 2, and 4. In an embodiment, the method 600 relates to the management of the parity data stored in a cache memory of a controller of a memory sub-system. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible. In an embodiment, as shown, operations denoted by dashed lines (e.g., operations 651-655) represent a further embodiment as detailed above in connection with FIGS. 4 and 5.

As shown in FIG. 6, at operation 610, the processing logic receives host data to be written to a storage area including a set of multiple planes of a memory device. In an embodiment, the storage area is a high density storage area which has multiple planes (e.g., a QLC NAND). The set of multiple planes can include N planes (e.g., where N=4). In an embodiment, multiple logical units (e.g., LUNs) are used to store data corresponding to the host data in a data structure including the multiple planes.

At operation 620, the processing logic executes a first party generation operation based on a portion of the set of multiple planes of the host data to generate a set of multi-plane parity data. In an embodiment, the first parity generation operation is an XOR operation based on the N−1 planes of host data. The portion of the set of multiple planes is less than the total set of planes. For example, for a total set of N planes, the portion includes N−1 planes of the host data. In an embodiment, the portion of the set of multiple planes does not include a last plane of host data. In an embodiment, the set of multi-plane parity data includes parity values based on N−1 planes of host data. For example, for a set of multiple planes including four planes, the set of multi-plane parity data is based on three planes of host data (e.g., Plane 0, Plane 1, and Plane 2).

At operation 630, the processing logic stores the set of multi-plane parity data in a cache memory of a controller of a memory sub-system. In an embodiment, an amount of storage in the cache memory needed to store the set of multi-plane parity data (based on N−1 planes of host data) is reduced as compared to storing parity data based on all of the N planes of the host data.

At operation 640, the processing logic executes a second parity generation operation based on the set of the multiple planes of the host data to generate a set of multi-page parity data. In an embodiment, the multi-page parity data (P0, P1, P2, P3, P4, and P5 shown in FIG. 3) is generated for each page line based on all of the planes (N planes) of the host data. At operation 650, the processing logic stores the multi-page parity data in the cache memory of the controller of the memory sub-system.

At operation 660, the processing logic performs a data recovery operation based on the set of multi-plane parity data and the set of multi-page parity data. In an embodiment, the data recovery operation is applied to the set of multi-plane parity data and the set of multi-page parity data to recover or reconstruction the host data that included the errors (e.g., one or more corrupted data pages or blocks) as a result of a failure. Advantageously, the data recovery operation can be performed to provide multi-plane and multi-page parity protection using parity data stored in the cache memory of the controller with a lower storage requirement as compared to conventional systems. The storage savings benefit is realized as a result of the storage of multi-plane parity data that is based on a portion (e.g., N−1 planes) of the total number of planes (e.g., N) planes of data.

In an embodiment, the processing logic can perform operations 651-655 to generate and store multi-plane multi-sub-block parity data, as described above in connection with FIGS. 4 and 5. In operation 651, the processing logic execute a third parity generation operation based on a first sub-block of the portion of the set of multiple planes of the host data to generate a first set of multi-plane sub-block parity data. In an embodiment, each plane of the multiple planes includes multiple sub-blocks (e.g., Sub-block (SB) 0, SB 1, etc.), where each sub-block includes multiple pages (e.g., three pages per sub-block). In an embodiment, the third parity generation operation is performed on a first sub-block of the portion of the set of multiple planes stored in the cache memory of the controller. The first sub-block is denoted as SB X−1 in FIGS. 4 and 5. In an embodiment, the first sub-block is SB 0 (where X=1). In an embodiment, the third parity generation operation is an XOR operation using the multi-plane In operation 652, the processing logic executes a fourth parity generation operation based on a second sub-block of the portion of the set of multiple planes of the host data to generate a second set of multi-plane sub-block parity data. In an embodiment, the second sub-block is denoted as SB X in FIGS. 4 and 5. In an embodiment, the second sub-block is SB 1 (where X=1). In an embodiment, the fourth parity generation operation is performed during or in response to the transfer of the second sub-block data from a controller write buffer to a memory device cache of a high density memory device. Accordingly, the second sub-block (SB 1) can be referred to as the "current" sub-block, and the first sub-block (SB 0) is referred to as the "previous" sub-block. In an embodiment, the first sub-block and the second sub-block are a sub-block pair including a previous sub-block and a current sub-block (e.g., SB 0 and SB 1; SB 1 and SB 2; SB 2 and SB 3, etc.).

In operation 653, the processing logic executes a fifth parity generation operation based on the first set of multi-plane sub-block parity data and the second set of multi-plane sub-block parity data to generate a set of multi-plane multi-sub-block parity data. In an embodiment, the In operation 654, the processing logic stores the set of multi-plane multi-sub-block parity data in the cache memory of a controller of the memory sub-system.

In operation 655, the processing logic performs a data recovery operation based on the set of multi-plane multi-sub-block parity data and the set of multi-page parity data. It is noted that, in an embodiment, operation 655 can be performed in place of operation 660 to enable the recovery of the data in response to the identification of a failure.

Figure 7:
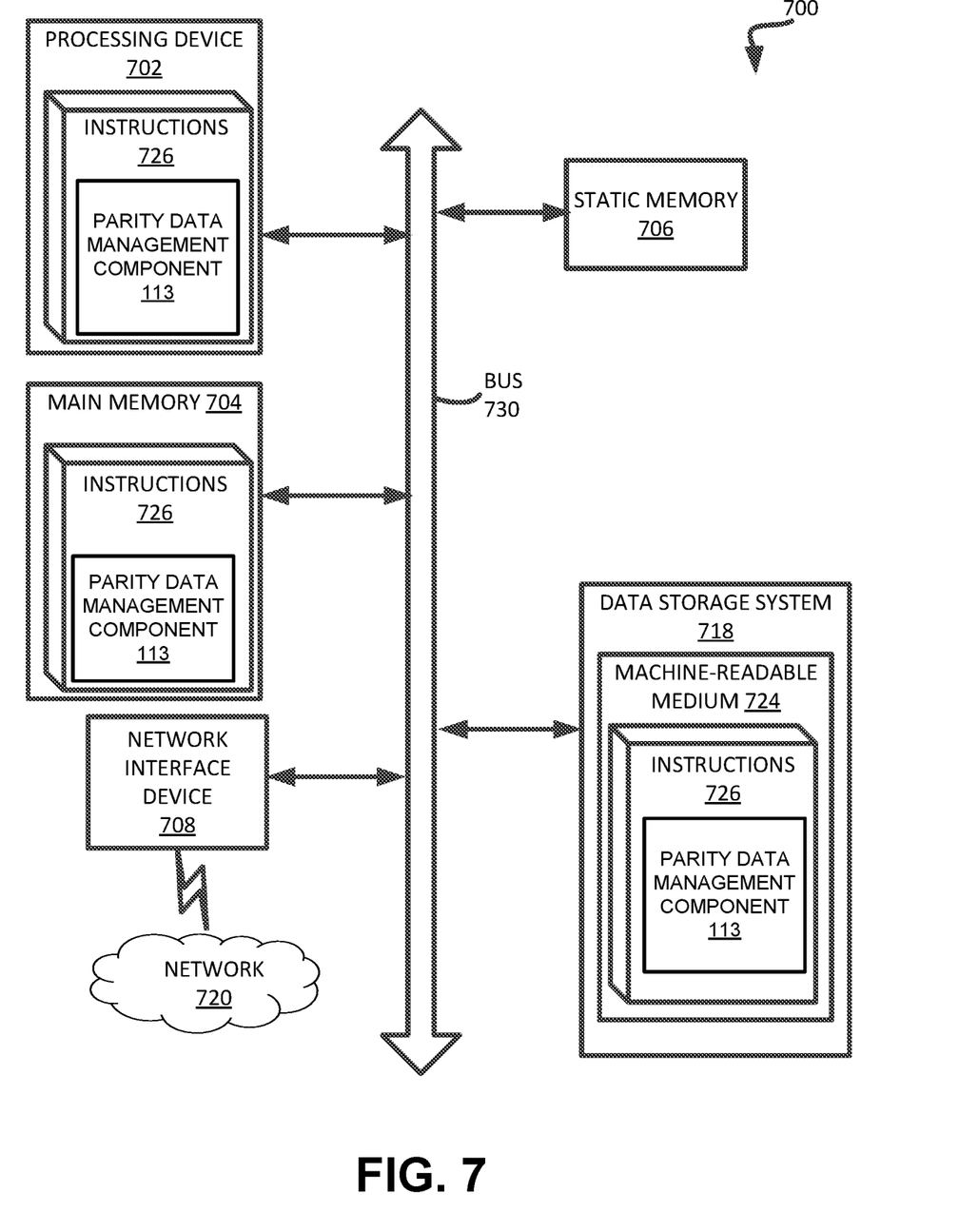
FIG. 7 is a block diagram of an example computer system in which implementations of the present disclosure can operate.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to a data protection component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, digital or non-digital circuitry, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1.

In one embodiment, the instructions 726 include instructions to implement functionality corresponding to a data protection component (e.g., the data protection component 113 of FIG. 1). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   receiving, by a processing device, host data to be written to a storage area including a set of multiple planes;
   executing a first parity generation operation based on a portion of the set of multiple planes of the host data to generate a set of multi-plane parity data;
   storing the set of multi-plane parity data in a cache memory of a controller of a memory sub-system;
   executing a second parity generation operation based on the set of multiple planes of the host data to generate a set of multi-page parity data;
   storing the set of multi-page parity data in the cache memory of the controller of the memory sub-system; and
   performing a data recovery operation based on the set of multi-plane parity data and the set of multi-page parity data.

2. The method of claim 1, wherein the portion of the set of multiple planes comprises less than a total number of planes of the host data.

3. The method of claim 1, further comprising executing a third parity generation operation based on a first sub-block of the portion of the set of multiple planes of the host data to generate a first set of multi-plane sub-block parity data.

4. The method of claim 3, further comprising executing a fourth parity generation operation based on a second sub-block of the portion of the set of multiple planes of the host data to generate a second set of multi-plane sub-block parity data.

5. The method of claim 4, further comprising executing a fifth parity generation operation based on the first set of multi-plane sub-block parity data and the second set of multi-plane sub-block parity data to generate a set of multi-plane multi-sub-block parity data.

6. The method of claim 1, wherein the first parity generation operation comprises an exclusive or (XOR) operation, and wherein the set of multi-plane parity data comprises a set of XOR parity values.

7. The method of claim 1, wherein the data recovery operation is performed to recover the host data in response to a failure.

8. A non-transitory computer readable medium comprising instructions, which when executed by a processing device, cause the processing device to perform operations comprising:
   detecting an error associated with host data written to a page of a storage area of a memory sub-system comprising a set of multiple planes;
   executing a first parity generation operation based on a portion of the set of multiple planes of the host data to generate a first set of multi-plane parity data;
   executing a second parity generation operation using the host data corresponding to a total number of the set of multiple planes to generate a second set of parity data; and
   performing a data recovery operation based at least in part on the first set of parity data and the second set of parity data.

9. The non-transitory computer readable medium of claim 8, wherein the first parity generation operation is executed using the host data corresponding to less than a total number of the set of multiple planes.

10. The non-transitory computer readable medium of claim 8, wherein the second parity generation operation comprises retrieving the second set of parity data from a cache memory of a controller.

11. The non-transitory computer readable medium of claim 10, wherein the second set of parity data comprises multi-page parity data.

12. The non-transitory computer readable medium of claim 8, wherein the first set of parity data comprises a set of XOR parity values corresponding to a portion of the host data comprising less than a total number of the set of multiple planes of the host data.

13. The non-transitory computer readable medium of claim 12, the operations further comprising:

generate a third set of parity data based on a first sub-block of the portion of the host data;
generate a fourth set of parity data based on a second sub-block of the portion of the host data; and
generate a fifth set of parity data based on the third set of parity data and the fourth set of parity data, wherein the data recovery operation is performed using the fifth set of parity data.

14. A system comprising:
a memory device; and
a processing device, operatively coupled with the memory device, to perform operations comprising:
receiving host data to be written to a storage area including a set of multiple planes;
executing a first parity generation operation based on a portion of the set of multiple planes of the host data to generate a set of multi-plane parity data;
storing the set of multi-plane parity data in a cache memory of a controller of a memory sub-system;
executing a second parity generation operation based on the set of multiple planes of the host data to generate a set of multi-page parity data;
storing the set of multi-page parity data in the cache memory of the controller of the memory sub-system; and
performing a data recovery operation based on the set of multi-plane parity data and the set of multi-page parity data.

15. The system of claim 14, wherein the portion of the set of multiple planes comprises less than a total number of planes of the host data.

16. The system of claim 14, the operations further comprising executing a third parity generation operation based on a first sub-block of the portion of the set of multiple planes of the host data to generate a first set of multi-plane sub-block parity data.

17. The system of claim 16, the operations further comprising executing a fourth parity generation operation based on a second sub-block of the portion of the set of multiple planes of the host data to generate a second set of multi-plane sub-block parity data.

18. The system of claim 17, the operations further comprising executing a fifth parity generation operation based on the first set of multi-plane sub-block parity data and the second set of multi-plane sub-block parity data to generate a set of multi-plane multi-sub-block parity data.

19. The system of claim 14, wherein the first parity generation operation comprises an exclusive or (XOR) operation, and wherein the set of multi-plane parity data comprises a set of XOR parity values.

20. The system of claim 14, wherein the data recovery operation is performed to recover the host data in response to a failure.

* * * * *